2,694,091
Patented Nov. 9, 1954

2,694,091

OXO PROCESS USING MIXTURE OF ALKENES AND DIENES

Philip Geoffrey Harvey and Norvik Ackroyd, Norton-on-Tees, England, assignors to Imperial Chemical Industries Limited, a corporation of Great Britain No Drawing. Application November 28, 1951, Serial No. 258,753

Claims priority, application Great Britain September 12, 1949

8 Claims. (Cl. 260—604)

This invention relates to the production of oxygenated organic compounds and is a continuation-in-part of application Serial No. 180,707, filed August 21, 1950, now abandoned.

It has previously been common practice in the carbonylation of olefines to employ as carbonylating gas a mixture of carbon monoxide and hydrogen in which the molar ratio $CO:H_2$ was 1:1 since this gives the stoichiometric proportions for direct addition to the double bond, but gas of this composition has a strongly corrosive effect on ordinary steel equipment. When the attempt is made to carbonylate olefines containing also di- and/or poly-enes using less corrosive gas mixtures and a dissolved cobalt compound as catalyst it has now been found that carbonylation is inhibited, apparently owing to the presence of these last two classes of compounds. However, it has been found possible according to the present invention to carbonylate these difficult mixtures by arranging to have present initially an olefine substantially free from said di- and poly-enes, preferably a substantially pure olefine, and using gas mixtures having compositions, and concentrations of dissolved cobalt compounds, all as hereinafter defined.

Moreover, the process of the present invention is economic in the sense that it gives high conversions and yields from these starting materials, which are so difficult to carbonylate, and that the auxiliary olefine is itself carbonylated and that, therefore, high output from the reaction vessel is achieved. This is especially so when the auxiliary olefine selected is one which carbonylates at substantially the same rate as would the difficult olefine if free from di- and poly-ene. This aspect is important economically by reason of the high capital cost of equipment required for superatmospheric pressure processes.

An additional advantage of the invention is that it permits the return of large quantities of hydrogen from the later carbonyl decomposition zone, and from the hydrogenation step to the carbonylation step and the use as feed gas in the last mentioned step of water gas with a $CO:H_2$ molar ratio of 1:1. This affords considerable economy in the over-all process.

Furthermore, by using carbonylating gas having the low $CO:H_2$ molar ratios claimed the need for costly CO-resistant apparatus is dispensed with. Besides, to the best of available knowledge, no one has been successful in continuously carbonylating olefines from cracked paraffins using the low $CO:H_2$ ratios described in the present specification without prior treatment of the olefine mixture.

According to the present invention there is provided a process of the Oxo-type for the production of organic oxygen containing compounds, especially aldehydes, by the reaction in the liquid phase of olefines containing at least one alkene having at least 5 carbon atoms in the molecule together with at least one olefine selected from alicyclic and aliphatic di-enes and poly-enes under elevated pressure and temperature in the presence of a previously activated cobalt catalyst, characterised in that: first said catalyst is formed in alkene having at least 5 carbon atoms in the molecule and substantially free from inhibiting materials having dissolved therein at least 0.01%, preferably 0.1%, by weight of cobalt calculated as metal by introducing into said alkene at elevated pressure and temperature a gas mixture comprising carbon monoxide and hydrogen having a $CO:H_2$ molar ratio of at least 1:5, preferably at least 1:3, and in which the partial pressure of carbon monoxide is at least 50 atmospheres until reaction is established and, thereafter, effecting carbonylation by introducing into the preformed catalyst solution at elevated temperature and pressure the olefinic material and a gas mixture comprising carbon monoxide and hydrogen in which the molar ratio $CO:H_2$ is from 3:7 to 2:3, while maintaining the cobalt concentration in the mixture at at least 0.1% by weight, calculated as metal, by introduction of a soluble organic compound thereof in solution.

The use as catalyst of a soluble organic cobalt compound in solution affords the advantages that it permits very accurate continuous control of cobalt concentration in the reaction space, which is of extreme importance in a sensitive process like the Oxo process and that, in contrast to catalyst suspensions, the reaction mixture can be easily pumped and erosion of valves and choking of lines can be substantially eliminated. The inhibiting effect of di- and/or poly-enes is very marked when active carbonylating catalyst is to be formed from dissolved organic cobalt compounds. Moreover, the ability to use with difficult alkene mixtures of this sort the low cobalt proportions specified, viz., 0.1%, results in considerable savings of this costly metal.

In order to keep corrosion to a minimum it is preferred to operate in the first stage with a gas in which the molar ratio $CO:H_2$ does not exceed 2:3.

Establishment of the main reaction is indicated by exothermicity or fall of pressure.

The process of the invention is especially applicable to mixtures containing from $C_5$ to $C_{18}$ mono-olefines, especially those containing up to 12 carbon atoms. It is of marked value in relation to $C_5$ olefines since these are most commonly obtained from cracking operations. Olefines produced by cracking may contain cyclic mono-olefines in appreciable amounts. Because of its lower volatility it is preferred to use as auxiliary olefine one containing at least 6 carbon atoms in the molecule.

While the invention is not to be considered as depending on any particular theory, it is believed that di- and poly-enes, especially those which are conjugated, inhibit carbonylation.

Di- and poly-enes are distinguished by having higher densities and refractive indices than the corresponding mono-olefines, and their presence is indicated by refractive index measurement, infra red spectroscopy, or density measurement.

Preferably the cobalt is employed as a soluble salt of an organic acid dissolved in the liquid feed or a part thereof, e. g., cobalt naphthenate or the acetate, laurate, hexahydrobenzoate or 3,5,5-trimethyl-hexoate. It may also be introduced as a solution in an inert medium, e. g., the hydrogenated alcohol product.

The invention is of particular value in relation to the production of aldehydes from $C_6$ to $C_8$ alkene mixtures, e. g., those containing alpha-olefines, obtained by the thermal cracking of higher hydrocarbons, e. g., paraffin waxes. Suitable temperatures are, for example 130°–190° C., preferably 150°–175° C., and a pressure of carbonylating gas of 200–300 atmospheres gauge, preferably 250 atmospheres.

The aldehydes produced by the process can be readily hydrogenated to alcohols at superatmospheric temperatures and pressures, e. g., 250° and 150 atmospheres gauge, using Cu or Ni catalysts. Copper-on-zinc oxide and copper-on-chromia are especially suitable catalysts for the hydrogenation step.

The process is illustrated by the following example.

Example (i) Operating according to the prior art process pure di-isobutene containing 0.1% of cobalt as naphthenate was fed to a reaction zone at 155° C. and 250 atmospheres pressure together with a mixture of carbon monoxide and hydrogen in which the molar ratio carbon monoxide:hydrogen was 1:3 in the proportion of 1000 cubic metres of free gas per cubic metre of di-isobutene, the liquid space velocity being 0.5 litre per litre of free reaction space per hour. Carbonylation was initiated immediately and there were obtained oxygenated organic compounds containing 3,5,5-trimethyl hexanal. When the inlet gas was cut off the reaction ceased, but re-started immediately on re-introduction of the carbonylating gas.

(ii) The process was repeated under the same conditions as given in paragraph (i) except that the di-isobutene feed was replaced by di-isobutene containing 5% of cyclopentadiene. After passing the same carbonylating gas for 2 hours it was found that no carbonylation had occurred.

(iii) Operation according to the process of the present invention will now be described using an alkene feed which trial showed could not be carbonylated under the conditions described in paragraphs (i) and (ii) above. A reactor is filled initially with di-isobutene containing 0.1% by weight of cobalt as the naphthenate and the whole is treated at 250 atmospheres gauge pressure and 140 to 160° C. with a mixed gas comprising 30% CO and 70% $H_2$, when reaction to oxygenated products occurs. Liquid di-isobutene containing the above catalyst is fed continuously at a liquid space velocity of 0.5 litre/litre/hour to the reactor for a period of 1 to 2 hours when the liquid feed stream is changed to a mixture of $C_6$ to $C_8$ alkenes, produced by the thermal cracking of paraffin wax, containing 0.1% by weight of cobalt dissolved therein as naphthenate and this is fed continuously to the reactor at the above liquid space velocity. Treatment of this feed at 150° to 170° C. and 250 atmospheres gauge pressure with a gas of the above composition at a gas:liquid ratio of 1000 cubic metres/cubic metre results in a pass conversion to oxygenated products of about 80% calculated on the alkene feed.

Operating according to the process of the invention the main end products, obtained after hydrogenation of the carbonylation product, from $C_n$ normal olefines are the normal $C_{n+1}$ alcohol and the 2-methyl-$C_n$ alcohol (where $n$=the number of carbon atoms). Thus normal heptanol and 2-methyl hexanol are obtained from normal hexene, and the corresponding normal and 2-methyl alcohols from normal heptane and octene. Other isomeric alcohols are also produced in minor amounts.

We claim:

1. A continuous process for the production of organic oxygen-containing compounds by carbonylating a mixture containing at least one alkene having at least five carbon atoms in the molecule together with at least one di-ene selected from the group consisting of aliphatic and alicyclic di-enes which comprises forming an activated cobalt catalyst by contacting in the liquid phase at elevated temperature and pressure a small proportion at least 0.01% by weight of cobalt, calculated as metal, in solution as an organic compound in a mixture of alkenes having at least five carbon atoms in the molecule and substantially free from inhibiting materials with carbon monoxide and hydrogen in which the molar ratio of $CO:H_2$ is at least 1:5 and in which the partial pressure of carbon monoxide is at least 50 atmospheres, until carbonylation reaction is established, and thereafter effecting carbonylation of said alkene mixture containing at least one di-ene by introducing said last named alkene mixture into the preformed catalyst solution, and reacting the mixture so formed in the liquid phase at elevated temperature and pressure with carbon monoxide and hydrogen in which the molar ratio of $CO:H_2$ is from 3:7 to 2:3, the concentration of cobalt in the mixture so formed being maintained in small concentration not less than 0.1% by weight of cobalt, calculated as metal, by introducing a soluble organic compound of cobalt in solution into the mixture so formed.

2. A process as claimed in claim 1 in which a portion of the olefines selected from the group consisting of aliphatic and alicyclic di-enes are conjugated.

3. A process as claimed in claim 1 in which the alkene used initially has at least 6 carbon atoms in the molecule.

4. A process as claimed in claim 1 in which the concentration of cobalt present in dissolved form in the first stage is at least 0.1% by weight, calculated as metal, of the liquid mixture.

5. A process as claimed in claim 1 in which the organic cobalt compound is the salt of a carboxylic acid.

6. A process as claimed in claim 1 in which the molar ratio, $CO:H_2$, of the gas used in forming the activated cobalt catalyst is up to 2:3.

7. A process as claimed in claim 1 in which the alkene mixture comprises $C_6$ to $C_8$ alkenes obtained by thermal cracking of higher hydrocarbons and in which a temperature of 130° to 190° C. and a pressure of 200 to 300 atmospheres gauge are employed.

8. A process as claimed in claim 1 in which the molar ratio $CO:H_2$ in the gaseous mixture employed in forming the activated cobalt catalyst is at least 1:3.

References Cited in the file of this patent

UNITED STATES PATENTS

| Number | Name | Date |
| --- | --- | --- |
| 2,437,600 | Gresham et al. | Mar. 9, 1948 |
| 2,477,554 | McKeever | July 26, 1949 |
| 2,497,303 | Gresham et al. | Feb. 14, 1950 |
| 2,587,858 | Keulemans | Mar. 4, 1952 |
| 2,647,149 | Condit et al. | July 28, 1953 |